(12) United States Patent
Kauffman, II et al.

(10) Patent No.: US 11,160,248 B2
(45) Date of Patent: Nov. 2, 2021

(54) DISPOSABLE CAT LITTER BOX

(71) Applicants: Porter W. Kauffman, II, Greenville, NC (US); Chad R. Kauffman, Wooster, OH (US)

(72) Inventors: Porter W. Kauffman, II, Greenville, NC (US); Chad R. Kauffman, Wooster, OH (US)

( * ) Notice: Subject to any disclaimer, the term of this patent is extended or adjusted under 35 U.S.C. 154(b) by 0 days.

(21) Appl. No.: 16/576,654

(22) Filed: Sep. 19, 2019

(65) Prior Publication Data

US 2020/0077617 A1 Mar. 12, 2020

Related U.S. Application Data

(63) Continuation-in-part of application No. 16/109,116, filed on Aug. 22, 2018, now Pat. No. 10,893,655.

(60) Provisional application No. 62/549,039, filed on Aug. 23, 2017.

(51) Int. Cl.
*A01K 1/00* (2006.01)
*A01K 1/01* (2006.01)

(52) U.S. Cl.
CPC .................... *A01K 1/0125* (2013.01)

(58) Field of Classification Search
CPC ....... A01K 1/00; A01K 1/0157; A01K 1/0125
USPC .................................. 119/161, 168
See application file for complete search history.

(56) References Cited

U.S. PATENT DOCUMENTS

| | | | | |
|---|---|---|---|---|
| 4,624,380 A | * | 11/1986 | Wernette | A01K 1/0125 119/168 |
| 4,782,788 A | * | 11/1988 | Arcand | A01K 1/0125 119/168 |
| 4,813,376 A | * | 3/1989 | Kaufman | A01K 1/0125 119/168 |
| 4,846,103 A | * | 7/1989 | Brown | A01K 1/0125 119/168 |
| 4,846,105 A | * | 7/1989 | Caldwell | A01K 1/0125 119/168 |
| 4,940,016 A | * | 7/1990 | Heath | A01K 1/0125 119/168 |
| 4,967,692 A | * | 11/1990 | Mills | A01K 1/0125 119/168 |
| 4,976,218 A | * | 12/1990 | Cirami | A01K 1/0125 119/168 |
| 4,981,104 A | * | 1/1991 | Goodwin | A01K 1/0125 119/168 |
| 5,014,649 A | * | 5/1991 | Taft | A01K 1/0125 119/168 |
| 5,035,205 A | * | 7/1991 | Schiller | A01K 1/0125 119/165 |
| 5,078,099 A | * | 1/1992 | Balson | B65D 5/3642 119/168 |
| 5,178,100 A | * | 1/1993 | Monk | A01K 1/0125 119/168 |

(Continued)

*Primary Examiner* — Richard T Price, Jr.
(74) *Attorney, Agent, or Firm* — Coats & Bennett, PLLC

(57) ABSTRACT

A cat litter box is designed to be folded into a compact form for storage and shipment to a customer and unfolded by the customer for use. When it is time to replace the litter box, the cat litter box can be refolded back into a compact form for disposal. A lid 40 protects the box during storage and shipment. The cat litter box is made of a contiguous piece of corrugated cardboard having a LLDPE coating applied to one side thereof, which forms the interior surfaces of the box.

17 Claims, 5 Drawing Sheets

(56) References Cited

U.S. PATENT DOCUMENTS

| | | | | |
|---|---|---|---|---|
| 5,203,282 | A | * | 4/1993 | Hasiuk .................. A01K 1/0125 119/168 |
| 5,465,686 | A | * | 11/1995 | Monetti .................. A01K 1/033 119/168 |
| 5,572,951 | A | * | 11/1996 | Evans .................. A01K 1/0125 119/168 |
| 5,727,499 | A | * | 3/1998 | Armington .......... A01K 1/0125 119/168 |
| 5,730,085 | A | * | 3/1998 | Santoiemmo ........ A01K 1/0125 119/168 |
| 5,845,601 | A | * | 12/1998 | Robinson ............. A01K 1/0125 119/168 |
| 9,439,490 | B2 | * | 9/2016 | DeGeorge .............. B65D 5/542 |
| 2011/0180008 | A1 | * | 7/2011 | Davis .................... B65F 1/0006 119/166 |
| 2012/0234252 | A1 | * | 9/2012 | Donta .................. A01K 1/0125 119/168 |

\* cited by examiner

DISPOSABLE CAT LITTER BOX

TECHNICAL FIELD

The present invention relates generally to cat litter boxes and, more particularly, to a disposable cat litter box with a corrugated cardboard construction.

BACKGROUND

Cat litter was developed for the purpose of allowing humans to share a living space with their cat. The invention of cat litter created a cohabitated space for humans and cats but also created two significant challenges most cat owners experience: finding ways to eliminate odor from the litter box, and managing the waste created by cats. Regular replenishment of fresh litter is required for hygiene purposes, and cat owners must properly dispose of soiled litter. Both activities are time consuming and unfavorable experiences for most cat owners. Typical cat litter available in today's retail establishments are heavy, awkward to handle and inconvenient for transporting home.

SUMMARY

A disposable cat litter box is designed to be folded into a compact form for storage and/or shipment to a customer. The cat litter box is prepacked with a predetermined amount of cat litter. The box is unfolded by the customer for use. When it is time to replace the cat litter box, it is refolded back into a compact form for disposal.

The cat litter box comprises a bottom and side walls extending upwardly from the bottom to form a litter compartment. Extension panels hingedly connect to respective side walls and are configured to move between a folded position in which the litter compartment is enclosed by the extension panels and an unfolded position in which the extension panels extend upward from the side walls to form an extended litter compartment. An opening or cut-out in one of the extension panels provides means for ingress into and egress out of the assembled cat litter box by a cat. In some embodiments, the box may include a lid to protect the box during storage and shipment.

In one exemplary embodiment, the box is manufactured from single wall "B flute" material. The interior surfaces of the box are protected from cat urine and moisture damage by applying a linear low-density polyethylene (LLDPE) coating directly to the corrugated board to protect the interior walls of the cat litter box 10 damage.

DETAILED DESCRIPTION

Referring now to the FIGS. 1-5, a disposable cat litter box according to one embodiment is shown and indicated generally by the numeral 10. The main components of the cat litter box 10 comprise a foldable box 12 and a lid 40. The cat litter box 10 is designed to be folded into a compact form for storage and shipment to a customer and unfolded by the customer for use. When it is time to replace the cat litter box 10, the cat litter box 10 can be folded back into a compact form for disposal. The lid 40 protects the box 12 during storage, shipment and disposal.

Figure 6:
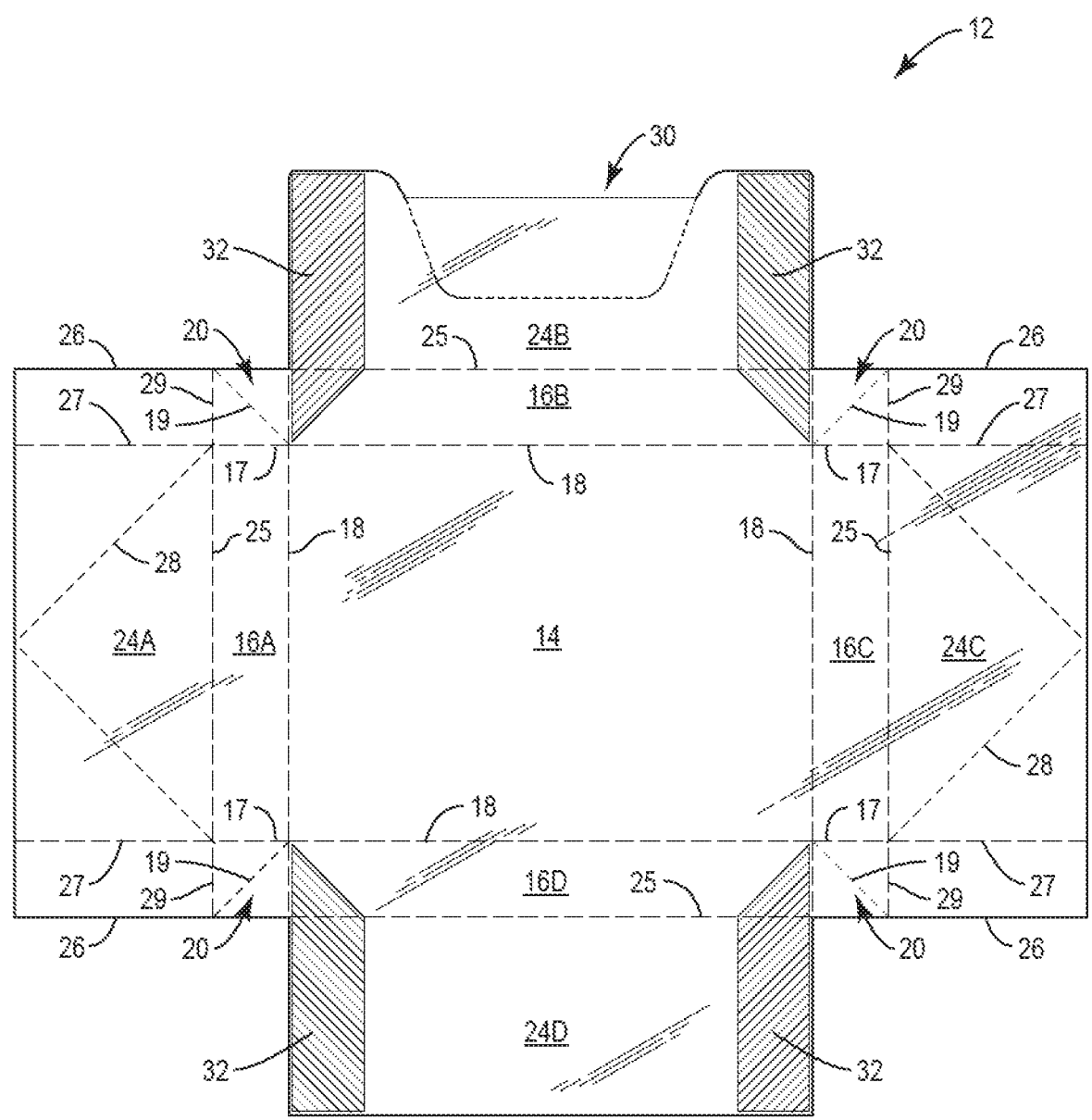
FIG. 6 is a plan view of a cardboard blank from which a box for use in the cat litter box is constructed.

In one embodiment, the foldable box 12 is generally rectangular in form and preferably constructed of corrugated cardboard or paperboard, though other materials could be used in some embodiments. In one embodiment, the box 12 measures approximately 19" L×14⅜" W×3" H (disassembled) and approximately 19" L×14" W×10¼" H (assembled), although the dimensions may differ in other embodiments. The box 12 comprises a bottom indicated generally by the numeral 14, side walls indicated generally by the numeral 16, and extension panels indicated generally by the numeral 24. The bottom 14 is formed by a single panel as seen in FIG. 6. The side walls 16, indicated individually by reference numerals 16A-16D, join at respective edges of the bottom 14 along horizontal fold lines 18. The side walls 16A-16D also join along corner fold lines 17 to respective corner panels 20, which include diagonal fold lines 19 so that the corner panels 20 fold inwardly when the box 12 is assembled. The bottom 14 and sidewalls 16 together define a litter compartment 36 inside the box 12 when the box 12 is assembled.

Extension panels 24, indicated individually by reference numerals 24A-24D, join respective side walls 16A-16D along horizontal fold lines 25. Extension panels 24A and 24C include side flaps 26 that connect along fold lines 27. The side flaps 26 overlap with and attach to extension panels 24B and 24D when the box 12 is assembled. The side flaps 26 also connect to the corner panels 20 along fold lines 29.

Glue 32 is applied to a portion of the extension panels 24B and 24D and side walls 16B and 16D. The triangular glue area on the side walls 16B and 16D secures the folded corner panels 20 when the box 12 is assembled. Similarly, the rectangular glue area on the extension panels 24B and 24D secures the side flaps 26 when the box 12 is assembled such that the extension panels are joined at the corners of the box 12.

Figure 1:
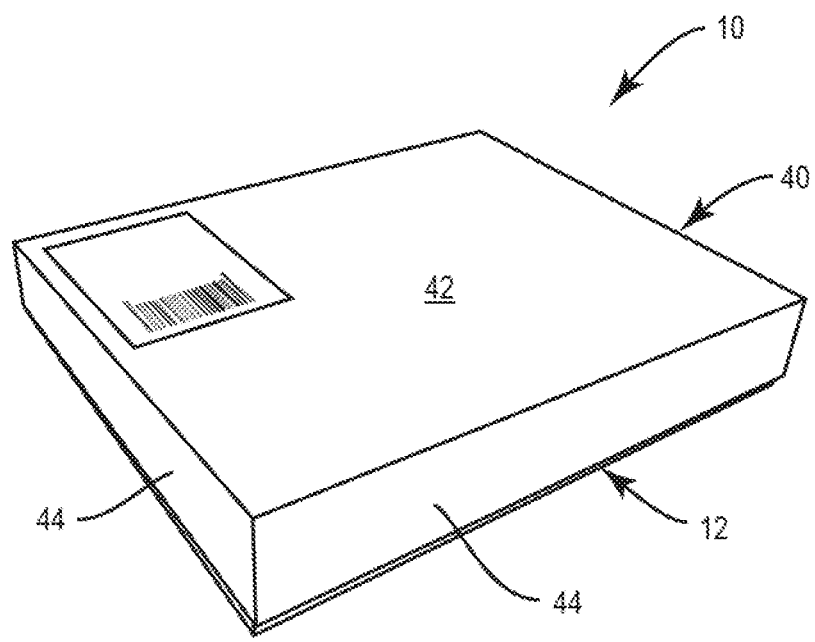
FIG. 1 is a perspective view of the cat litter box in a folded configuration with the lid in place.
Figure 2:
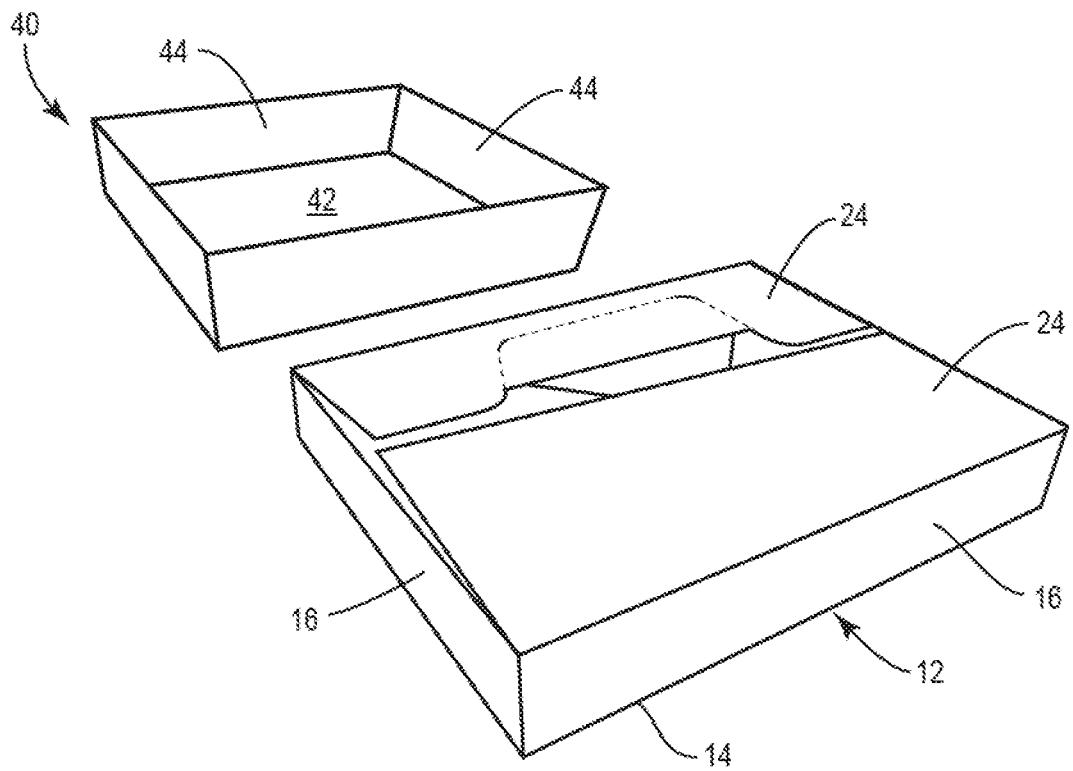
FIG. 2 is a perspective view of the cat litter box in a folded configuration with the lid removed.
Figure 5:
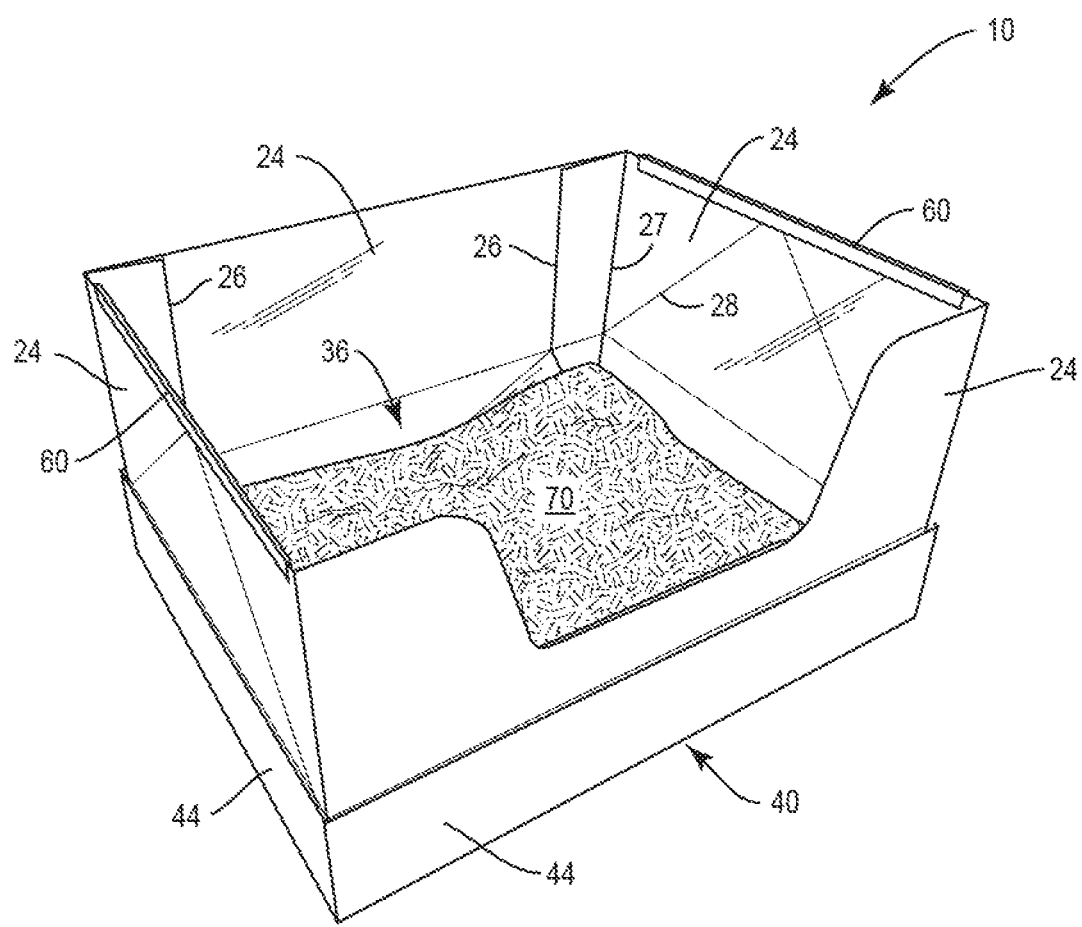
FIG. 5 is a perspective view of the cat litter box fully assembled for use with the extension panels unfolded and locked.

The extension panels 24 are moveable between a folded position as shown in FIG. 2 and an unfolded position as shown in FIG. 5. The diagonal fold lines 28 of extension panels 24A and 24C enable the extension panels 24A and 24C to fold inwardly while joined at the corners with extension panels 24B and 24D. Extension panel 24B includes a perforated cut-out 30 that when removed provides an opening for a cat to enter into and exit from the litter compartment 36 when the cut-out is removed by the user The lid 40 of the cat litter box 10 is also rectangular in form and conforms to the shape of the box 12. The lid 40 includes a top 42 and side walls 44 that extend down from the top 42. The top 40 and side walls 44 are sized to fit over the side walls 16 of the box 12 when the extension panels 24 are in the folded position as shown in FIG. 2. FIG. 1 illustrates the lid 40 fitted over the box 12.

The reinforcing strips 60 provide structural support for and protect the top edges of the extension panels 24A and 24C when the cat litter box 10 is assembled for use. Similar protective strips (not shown) could also be applied to the top edges of the side walls 24B and 24D for protection of the top edges. The reinforcing strips 60 in one embodiment comprise extruded polymer strips with an inverted u-shaped cross section configured to slide onto the top edges of the extension panels 24.

In one embodiment, the box 12 and lid 40 are manufactured from single wall "B flute" material. The height of the extension panels 24 helps keep the litter contained within the litter compartment during use. An entrance opening into the cat litter box 10 for the cat measures, in one embodiment 11" W×5½"H so that a cat can easily enter into and exit from the litter compartment when the cat litter box 10 is in use. The lid 40 can be placed on the bottom 14 of the box 12 during use as shown in FIG. 5, or alternatively be placed over the extension panels 24 to cover the extended litter compartment during use.

The interior surfaces of the box 12 can be protected from cat urine and moisture damage by applying a linear low-density, polyethylene (LLDPE) coating 52 to the inside surfaces of the corrugated cardboard 50. In some embodiments, the interior and exterior surfaces of the lid 40 are also be protected in a similar manner. The interior coating provides a moisture barrier that protects the interior of the box 12 from cat urine. An exterior coating can also be applied to the outer surfaces of the box 12 if desired to protect the box 12 from moisture damage during home delivery.

Figure 7:
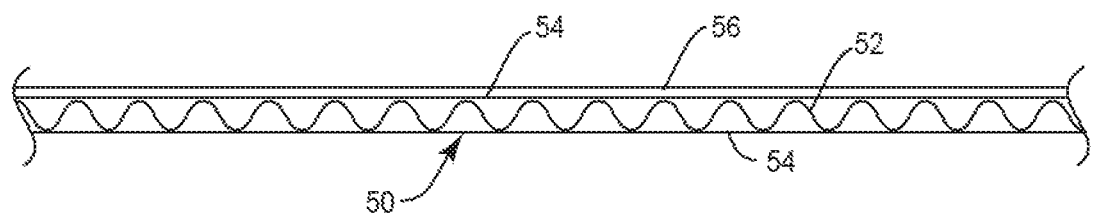
FIG. 7 is a section view showing through a portion of the box 12 showing the coating on the interior surface.

A cross-section of the corrugated cardboard 50 is shown in FIG. 7. The corrugated cardboard comprises corrugated fluting 52 sandwiched between two plies or layers of plain paperboard 54. To make the corrugated cardboard 50, the LLDPE coating can be applied to one layer of the paperboard 54 that is used in the manufacture of the corrugated cardboard 50 prior to adhering the paperboard 54 to the fluting 52. The corrugated cardboard 50 is then made adhering a ply of plain paperboard 54 with the LLDPE coating 56 and a ply of plain paperboard 54 without coating on opposing sides of the fluting 52. The ply of paperboard 54 with the LLDPE coating 56 forms the interior of the box 12 and the ply of paperboard 54 without the LLDPE coating 56 forms the exterior surfaces of the box 12. In another embodiment, the paperboard 54 on both sides of the corrugated cardboard 50 can have an LLDPE coating 52 applied.

In use, the cat litter box 10 pre-packaged with cat litter 70 is purchased by or shipped to a user in a folded configuration as shown in FIG. 1. The reinforcing strips 60 strips along with a bag of cat litter 70 are enclosed inside the box 12. In one embodiment, the cat litter 70 comprises a silica gel bead that varies in size from about 3 mm to about 8 mm in diameter. The cat litter 70 is packaged inside a sealed bag with an easy to open tear strip for the customer's use. The sealed bag keeps any moisture from coming in contact with the cat litter 70 prior to its use as a litter.

Figure 3:
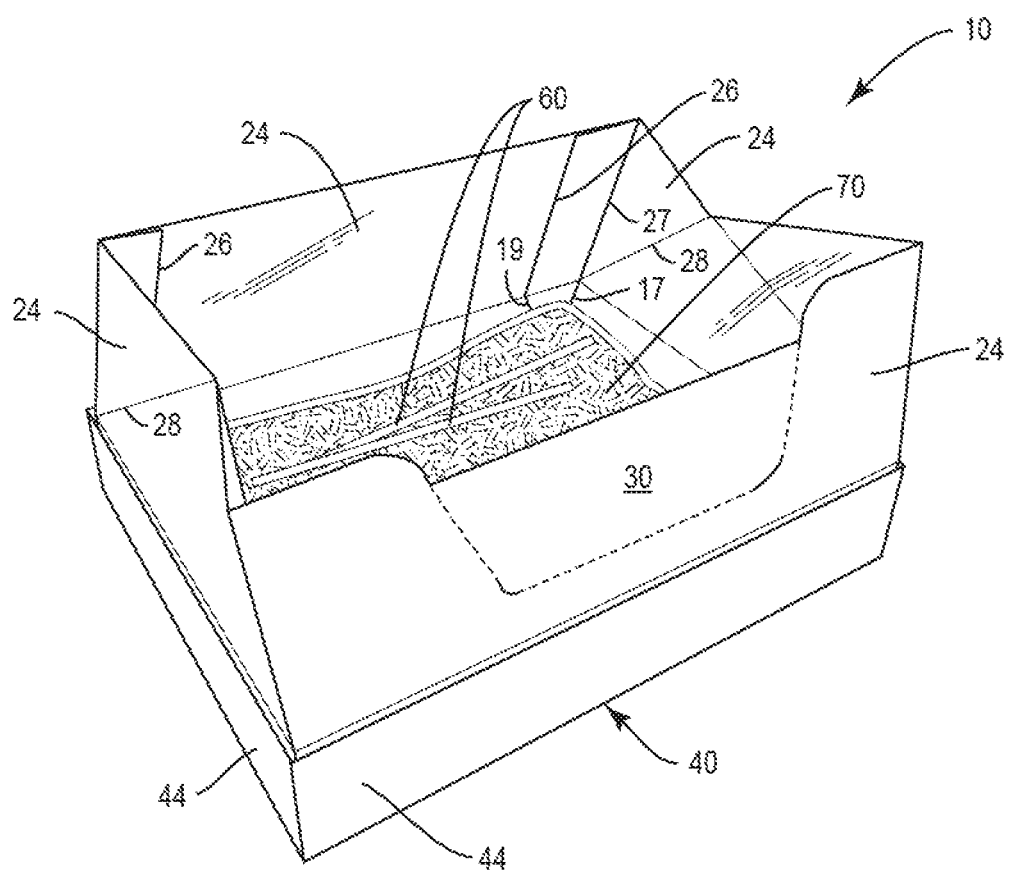
FIG. 3 is a perspective view of the cat litter box with the lid placed on the bottom and the extension panels partially unfolded.
Figure 4:
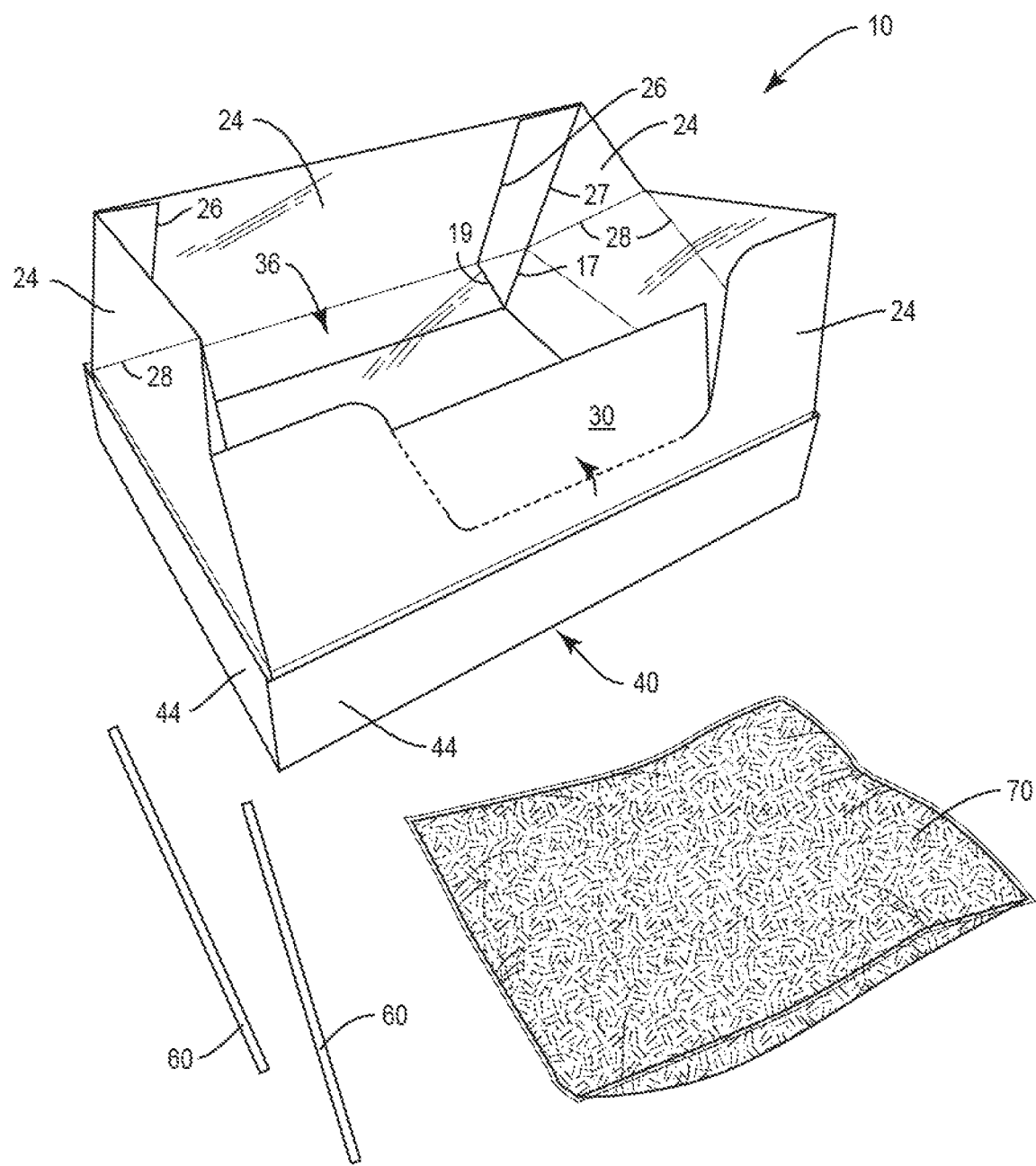
FIG. 4 is a perspective view of the cat litter box with the lid placed on the bottom and the contents removed.

To put the cat litter box 10 into use, the customer removes the lid 40 from the folded box 12, folds the extension panels 24 upward and outward to the unfolded position as shown in FIGS. 3 and 4, and places the reinforcing strips 60 provided on the top edges of the side panels 24A and 24C to lock the cat litter box 10 into the final operational position as shown in FIG. 5. The perforated cut-out 30 can either be removed and discarded or folded down inside the cat litter box 10 to provide an opening for the cat to enter into and exit from the cat litter box 10. The lid 40 may be stored by placing it under the cat litter box 10 as shown, or may be placed on top for use as a cover.

After approximately 30 days of use, the cat litter box 10 is ready to be properly disposed of. The reinforcing strips 60 are removed and placed inside the cat litter tray 50 or otherwise disposed of. The litter box is the folded back into the original folded position and the lid 40 is placed back on the top of the cat litter box 10 as shown in FIG. 1 for disposal.

What is claimed is:

1. A cat litter box comprising:
   a bottom;
   side walls extending upwardly from the bottom to form a litter compartment;
   extension panels hingedly connected to respective side walls and configured to move between a folded position in which the cat litter compartment is enclosed by the extension panels and an unfolded position in which the extension panels extend upward from the side walls to form an extended litter compartment;
   wherein the bottom, side walls and extension panels are made from a contiguous corrugated cardboard blank comprising an intermediate corrugated fluting, a pre-coated paperboard ply with a low-density polyethylene coating attached to a first side of the corrugated fluting, and an uncoated paperboard ply attached to an opposing second side of the corrugated fluting; and
   an opening in one of the extension panels to enable a cat to enter into and exit from the extended litter compartment when the sidewalls are in the unfolded position.

2. The cat litter box of claim 1 further comprising a lid configured to be inserted over the sidewalls of the cat litter box when the extension panels are in the folded position.

3. The cat litter box of claim 1 further comprising one or more reinforcing members to hold the extension panels in the unfolded position.

4. The cat litter box of claim 1 wherein the cat litter box is rectangular in form and includes four sidewalls joined at the four corners of the cat litter box.

5. The cat litter box of claim 4 comprising four extension panels hingedly connected to respective sidewalls and configured to fold inwardly from the unfolded position to the folded position.

6. A cat litter box constructed from corrugated cardboard, the cat litter box comprising:
   a bottom;
   side walls connected to and extending from the bottom to form a litter compartment;
   extension panels hingedly connected to the side walls and configured to move between a folded position in which the litter compartment is enclosed by the extension panels and an unfolded position in which the extension panels extend upward from the side walls to form an extended litter compartment with adjacent ones of the extension panels hingedly connected together; and
   an opening in one of the extension panels to enable a cat to enter into and exit from the extended litter compartment when the sidewalls are in the unfolded position;
   the corrugated cardboard comprising a contiguous blank comprising a corrugated fluting, a first paperboard ply attached to a first side of the corrugated fluting, and a second paperboard ply attached to a second side of the corrugated fluting;
   wherein the first paperboard ply comprises a low-density polyethylene coating that is adhered to the first paperboard ply prior to the first paperboard ply being attached to the first side of the corrugated fluting;

wherein the second paperboard ply is uncoated with the low-density polyethylene coating.

7. The cat litter box of claim 6 further comprising the first paperboard ply with the low-density polyethylene coating positioned on an interior side of the cat litter box and the second paperboard ply positioned on an exterior side of the cat litter box.

8. The cat litter box of claim 6 wherein the adjacent ones of the side walls are glued together.

9. The cat litter box of claim 8 wherein opposing ones of the extension panels comprise side flaps that fold inward and overlap with adjacent ones of the extension panels in the folded position.

10. The cat litter box of claim 6 wherein adjacent ones of the extension panels overlap in the unfolded position.

11. The cat litter box of claim 6 further comprising:
corner panels positioned between the side panels and that fold inwardly in the folded position; and
glue areas on the side walls that secure the corner panels in the folded position.

12. The cat litter box of claim 6 wherein the extension panels are configured to be locked in the unfolded position.

13. The cat litter box of claim 6 further comprising a lid configured to be inserted over the sidewalls of the cat litter box when the extension panels are in the folded position.

14. A method of manufacturing a cat litter box, the method comprising:
manufacturing a contiguous corrugated cardboard blank comprising:
applying a low-density polyethylene coating to a paperboard;
adhering the coated paperboard to a first side of a corrugated fluting;
adhering an uncoated paperboard to an opposing second side of the corrugated fluting;
forming the corrugated cardboard blank into a cat litter box comprising:
a bottom;
side walls connected to and extending from the bottom to form a litter compartment;
extension panels hingedly connected to the side walls and configured to move between a folded position in which the litter compartment is enclosed by the extension panels and an unfolded position in which the extension panels extend upward from the side walls to form an extended litter compartment with adjacent ones of the extension panels hingedly connected together; and
an opening in one of the extension panels to enable a cat to enter into and exit from the extended litter compartment when the sidewalls are in the unfolded position.

15. The method of claim 14, further comprising gluing together portions of the extension panels and the side walls and forming corners in the corrugated cardboard blank.

16. The method of claim 14, wherein forming the cat litter box comprises forming an interior of the cat litter box with the coated paperboard and an exterior of the cat litter box with the uncoated paperboard.

17. The method of claim 14, wherein further comprising forming a perforated section in the extension panel that forms the opening to enable the cat to enter into and exit the extended litter compartment.

* * * * *